United States Patent [19]

Mills

[11] Patent Number: 5,419,263
[45] Date of Patent: May 30, 1995

[54] REMOTE CONTROL TV TABLE

[76] Inventor: Jerry T. Mills, 2320 U.S. Hwy. 42, LaGrange, Ky. 40031

[21] Appl. No.: 115,588

[22] Filed: Sep. 3, 1993

[51] Int. Cl.⁶ .............................................. A47F 5/12
[52] U.S. Cl. ................................. 108/6; 108/25; 108/150; 108/95; 248/122; 248/205.2
[58] Field of Search ............... 108/150, 25, 50, 93, 108/94, 95, 103; 248/122, 205.2, 175, 185, 676; 211/13

[56] References Cited

U.S. PATENT DOCUMENTS

| | | | |
|---|---|---|---|
| 1,708,761 | 4/1929 | Horbath | 248/185 |
| 3,094,949 | 6/1963 | Oom | 108/94 X |
| 3,532,225 | 10/1970 | Reed | 248/175 X |
| 3,698,328 | 10/1972 | Weir | 100/49 X |
| 4,247,069 | 1/1981 | Kurz | 248/185 |
| 4,712,693 | 12/1987 | Striplin | 248/205.2 X |
| 5,154,391 | 10/1992 | Hegarty | 248/205.2 X |
| 5,293,825 | 3/1994 | Cauffiel | 100/49 |
| 5,316,249 | 5/1994 | Anderson | 211/13 X |

Primary Examiner—José V. Chen

[57] ABSTRACT

A table adapted to hold a TV remote control or other similar control mechanism. The table includes a plate having a top surface and a bottom surface, a pile type fastener for coupling a remote control to the top surface, a pedestal having a base extended in a horizontal plane, and a rod having a lower end and upper support end. The lower end of the rod is coupled to and extends upwards from the base. The upper support end of the rod includes a mechanism for pivotally coupling the pedestal to the bottom surface of the plate, enabling the orientation of the plate relative to the pedestal to be modified such that a remote control coupled to the top surface may be aimed at a desired location without removing it from the plate.

2 Claims, 4 Drawing Sheets

REMOTE CONTROL TV TABLE

BACKGROUND OF THE INVENTION

1. Field of the Invention

The present invention pertains to a remote control TV table and more particularly pertains to an item of furniture which may be used to removable hold and position a TV remote control as well as support a large number of other articles.

2. Description of the Prior Art

The use of devices for holding and positioning TV remote controls or other similar control mechanisms is known in the prior art. More specifically, devices heretofore devised and utilized for the purpose of holding and positioning remote controls are known to consist basically of familiar, expected and obvious structural configurations, notwithstanding the myriad of designs encompassed by the crowded prior art which have been developed for the fulfillment of countless objectives and requirements.

For example, a support apparatus for a TV controller and program guide is illustrated in U.S. Pat. No. 5,042,670 to Timberlake. The apparatus includes a rack constructed to support a TV remote control and hold a TV program listing booklet. A remote control can be operated by a person without removing the it from the rack.

Another patent of interest is U.S. Pat. No. 4,991,892 to Burrell which describes a remote control holder having a plurality of elongate support members for coupling at least one remote control thereto. The holder may be positioned in an upright position and includes an orifice for storage of a TV program listing.

Other patents that illustrate components generally related to the invention are U.S. Pat. Nos. 4,405,046 to Schultz, 268,072 to Boggs, and 295,469 to Green.

While these devices fulfill their respective, particular objective and requirements, the aforementioned patents do not describe a remote control TV table that includes strip of velcro attached thereon that is adapted to be coupled to a remote control having a complementary piece of a pile type fastener attached thereto. The aforementioned patents do not describe a table that includes a base adapted to fit under existing furniture in order to conserve floor space. Furthermore, the patents do not describe a table that pivots such that a remote control coupled thereto may be aimed without removing it from the table.

In this respect, the remote control TV table substantially departs from the conventional concepts and designs of the prior art. Therefore, it can be appreciated that there exists a continuing need for an improved device which can be used to hold and position a TV remote control or other similar control mechanism. In this regard, the present invention substantially fulfills this need.

SUMMARY OF THE INVENTION

In the view of the foregoing disadvantages inherent in the known types of devices for holding and positioning a remote control now present in the prior art, the present invention provides an improved construction wherein the same can be utilized for holding and positioning a TV remote control or other similar control mechanism. As such, the general purpose of the present invention, which will be described subsequently in greater detail, is to provide a new and improved device for holding and positioning a remote control which has all the advantages of the prior art and none of the disadvantages.

A remote control TV table comprising: three wooden plates coupled together end to end in a generally rectangular configuration to define a platform having a top surface, a left surface, a right surface, and a space therebetween; a strip of a pile type fastener attached to the top surface of the platform, the strip adapted to be coupled to another object having a complementary piece of a pile type fastener attached thereto, particularly a TV remote control; a wooden plate coupled between the left and right surface within the space and offset beneath the top face to define a shelf for holding magazines; a pedestal formed of a rod wherein the rod is of a generally rigid material, the rod including a lower free end, an upper support end, and an intermediate location defined between the free end and the support end, the rod further including a lower portion, intermediate portion, and upper portion, the lower portion extending in a generally U-shaped configuration in a horizontal plane to define a base, the intermediate portion extending upward in a curve from the lower portion to the intermediate location, and the upper portion extending offset from the vertical upward from the intermediate location to the support end, the base adapted to fit under a piece of furniture in order to conserve floor space, the height of the pedestal adapted to allow the top face to be easily accessed; and a rigid post, the post coupled beneath the shelf between the left face and right face, the post further having a swivel housing thereon for pivotally coupling the support end of the rod to the post, whereby coupling the platform to the pedestal and enabling the orientation of the platform relative to the pedestal to be modified such that a TV remote control coupled to the top face may be aimed at the TV without removing it from the platform.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the design of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved remote control TV table which has all the advantages of the prior art or devices of a similar nature and none of the disadvantages.

It is another object of the present invention to provide a new and improved remote control TV table which may be easily and efficiently manufactured and marketed.

It is a further object of the present invention to provide a new and improved remote control TV table which is of durable and reliable construction.

An even further object of the present invention is to provide a new and improved remote control TV table which is susceptible of a low cost of manufacture with regard to both materials and labor, and which accordingly is then susceptible of low prices of sale to the consuming public, thereby making such a remote control TV table economically available to the buying public.

Still yet another object of the present invention is to provide a new and improved remote control TV table which provides in the apparatuses and methods of the prior art some of the advantages thereof, while simultaneously overcoming some of the disadvantages normally associated therewith.

Another object of the invention is to retain the TV remote controls close to the viewer.

Another object of the invention is to move a TV table as close as possible to the user.

Another object of the invention is to increase the enjoyment of a person watching TV by keeping the needed things close for easy access.

Lastly, it is an object of the invention to provide a remote control TV table comprising a plate having a top face and a bottom face, means for removable coupling an object, particularly a TV remote control, to the top face of the plate, a pedestal including a base extended in a generally horizontal plane, the pedestal also including a rod having a lower end and upper support end, lower end coupled to the base such that the rod extends upwards from the base and means for pivotally coupling the upper support end of the rod to the bottom face of the plate, thereby coupling the plate to the pedestal and enabling the orientation of the plate relative to the pedestal to be modified such that a remote control coupled to the top face may be aimed at a desired location without removing it from the plate.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figures 1, 2:
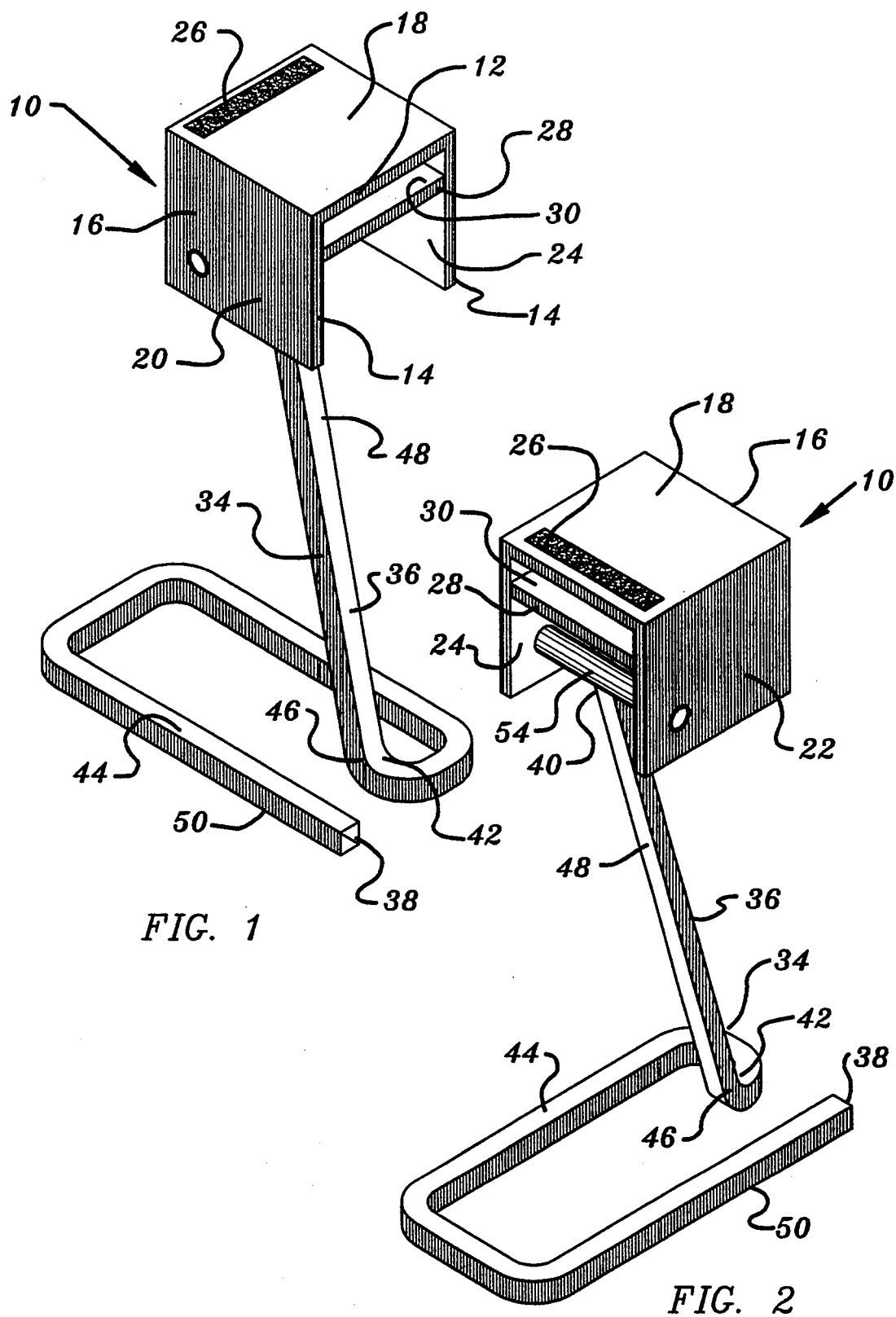
FIG. 1 is a perspective view of remote control TV table constructed in accordance with the principles of the present invention.
FIG. 2 is a perspective view of the remote control TV table shown in FIG. 1 but viewed from another angle.
Figure 3:
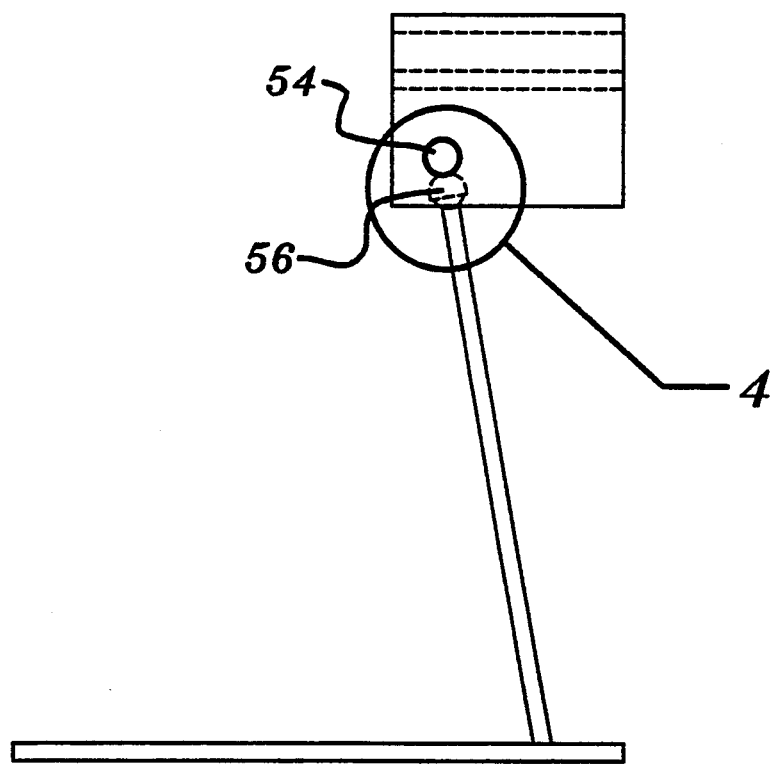
FIG. 3 is a side schematic view of the remote control TV table of the prior figures.
Figure 4:
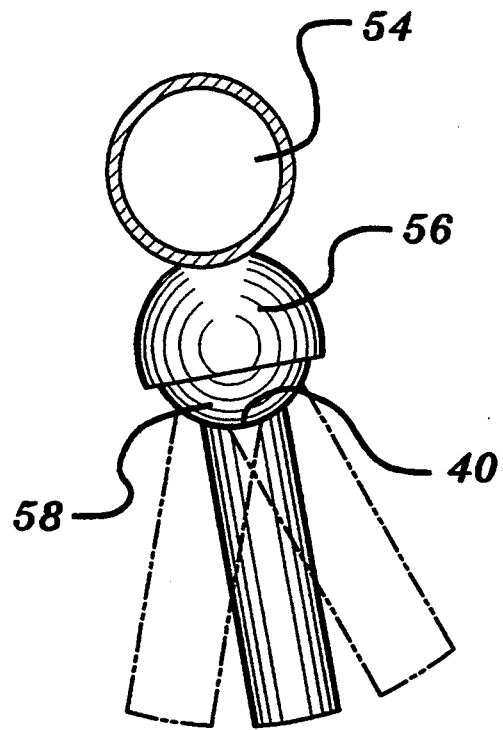
FIG. 4 is an enlarged view of the swivel elements of FIG. 3.

With reference now to the drawings, and in particular, to FIGS. 1 through 4 thereof, a new and improved remote control TV table embodying the principles and concepts of the present invention and generally designated by the reference number 10 will be described.

The remote control TV table 10 comprises wooden plates 12 and 14 coupled together end to end in a generally rectangular configuration. They thus define a platform 16 having a top surface 18, a left face 2, a right face 22, and a space 24 therebetween. A strip of a pile type fastener 26 is attached to the top surface of the platform. The strip is adapted to be coupled a TV remote control or other similar control mechanism having a complementary piece of like pile type fastener attached thereto. Coupling the remote control to the platform helps ensure that it will not be knocked off if the platform is bumped or moved. A wooden plate 28 is coupled between the left and right face of the platform within the space and offset beneath the top face to define a shelf 30 for holding magazines such as a TV program listings.

A pedestal 34 is formed of a rod 36 fashioned of aluminum, brass, steel, or any other such rigid but malleable and decorative material. The rod 36 includes a lower free end 38, an upper support end 40, and an intermediate location 42 defined between the free end and the support end. The rod also includes a lower portion 44, intermediate curved portion 46, and upper portion 48. The lower portion 44 extends in a generally U-shaped configuration in a horizontal plane to define a base 50. The intermediate portion 46 extends upward is a curve from the lower portion 44 to an intermediate location 42 offset from the horizontal plane, and the upper portion extends upward offset from the vertical from the intermediate location 42 to the support end 40. The base 50 is adapted so that it may easily fit under a piece of furniture, like a easy chair or couch, in order to conserve floor space. This feature allows the table to be placed in a room without having to move existing furniture to accommodate it. The height of the pedestal is adapted to allow the top surface to be easily accessed when sitting or standing.

A post 54 is coupled to the platform beneath the shelf 30 between the left face and right face. The post 54 has a swivel housing 56 thereon that is pivotally coupled to the support end of the rod 36 through ball 58 coupled to the support end 40 of the rod 36. This allows coupling the platform to the pedestal and enables the angular orientation of the top surface platform relative to the base of the pedestal to be modified such that a TV remote control mechanism coupled to the top surface of the platform may be operatively aimed at the TV without removing the TV remote control from the platform.

Figure 5:
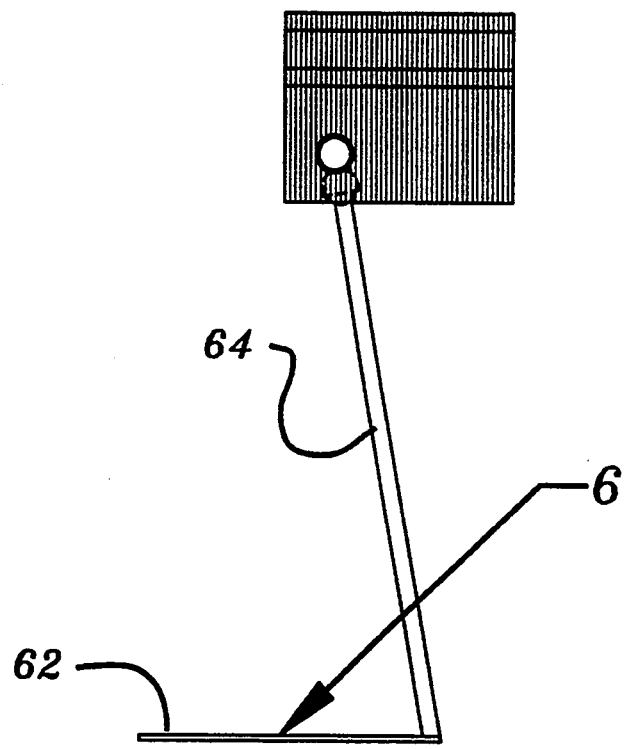
FIG. 5 is a side view of an alternate embodiment of the remote control TV table constructed in accordance with the principles of the present invention.
Figure 6:
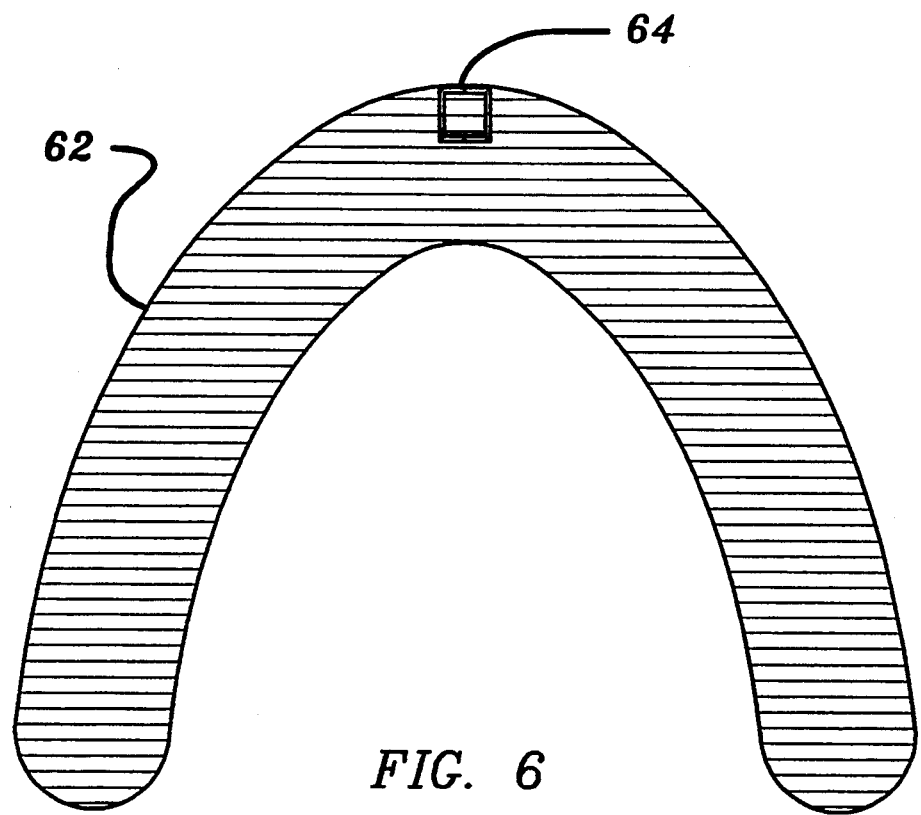
FIG. 6 is a view of the pedestal base shown in FIG. 5.

A second embodiment of the present invention is shown in FIGS. 5 and 6 and includes a different type of pedestal. The pedestal of this embodiment has a generally U-shaped base 62 extended in a horizontal plane and a rod 64 having a lower end coupled to the base and an upper end pivotally coupled to the platform through a swivel coupling as in the prior embodiment.

Figure 7:
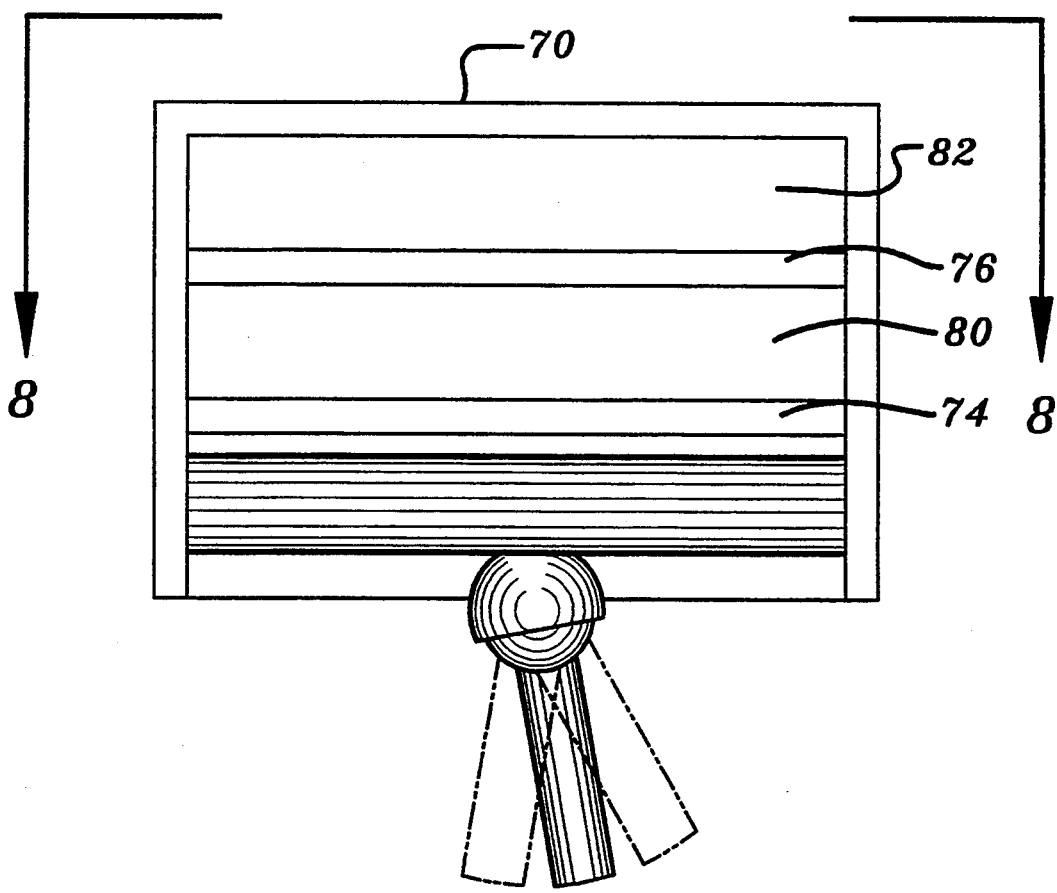
FIG. 7 is a view of a double shelf area constructed in accordance with yet another alternate embodiment of the invention.
Figure 8:
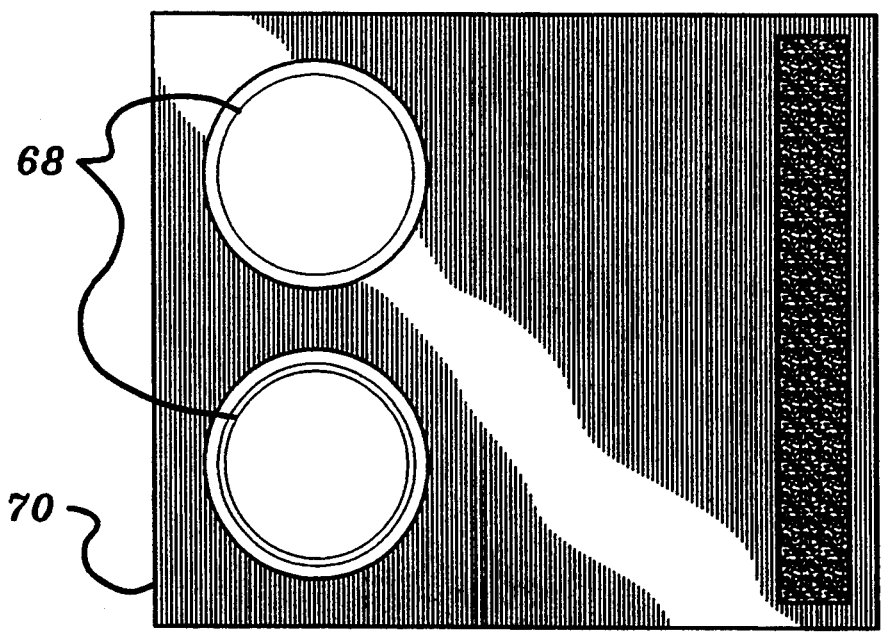
FIG. 8 is a plan view of the top face of the platform of the FIG. 7 embodiment taken along line 8—8 of FIG. 7.

A third embodiment of the present invention is shown in FIGS. 7 and 8 and comprises substantially all of the features of the first embodiment further including a plurality of recessed areas 68 disposed on the top face 70 of the pedestal defining cut-outs. The cut-outs are adapted for holding glasses, ashtrays, and other like item. This feature proves particularly useful because it helps ensure that when the platform is pivoted, items placed on the platform do not slip off or spill. In addition, plural horizontal plates 74 and 76 are utilized to form two shelves 80 and 82 or storing books or the like. In these alternate embodiments, essentially all other elements of the combination are the same as in the primary embodiment of FIGS. 1 through 4.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A remote control TV table comprising:
    three rigid plates coupled together end to end in a generally rectangular configuration to define a platform having a top surface, a left surface, a right surface, and a space therebetween;
    a strip of pile type fastener attached to the top surface of the platform, the strip adapted to be coupled to another object having a complementary piece of pile type fastener attached thereto, particularly a TV remote control;
    a rigid plate coupled between the left and right surface within the space and offset beneath the top surface to define a shelf for holding magazines;
    a pedestal formed of a rod wherein the rod is of a generally rigid material, the rod including a lower free end, an upper support end, and an intermediate location defined between the free end and the support end, the rod further including a lower portion, intermediate portion, and upper portion, the lower portion extending in a generally U-shaped configuration in a horizontal plane to define a base, the intermediate portion extending upward in a curve from the lower portion to the intermediate location, and the upper portion extending offset from the intermediate location to the support end, the base adapted to fit under a piece of furniture in order to conserve floor space, the height of the pedestal adapted to allow the top surface to be easily accessed; and
    a rigid post coupled beneath the shelf between the left surface and right surface, the post further having a swivel housing thereon pivotally coupling the support end of the rod to the post for enabling the angular orientation of the top surface of the platform relative to the base of the pedestal to be modified such that a TV remote control coupled to the top surface may be operatively aimed at a TV without removing the TV remote control from the platform.

2. The device as set forth in claim 1 and further including:
    a plurality of recessed areas disposed on the top surface defining cut-outs adapted for holding the bottom ends of glasses, ashtrays, and similar item.

* * * * *